_United States Patent_ [19]

Coppa et al.

[11] 4,268,138

[45] May 19, 1981

[54] FOLLOW FOCUS FLASH ARRANGEMENT

[75] Inventors: Richard J. Coppa, Westwood; Seymour Ellin, Chestnut Hill; John W. Stempeck, Reading, all of Mass.

[73] Assignee: Polaroid Corporation, Cambridge, Mass.

[21] Appl. No.: 42,912

[22] Filed: May 29, 1979

[51] Int. Cl.³ .......................... G03B 7/14; G03B 7/16; G03B 15/03
[52] U.S. Cl. ...................................... 354/27; 354/34; 354/51; 354/147
[58] Field of Search ............................. 354/27, 33–34, 354/50, 51, 60 F, 129, 137–138, 147

[56] References Cited

U.S. PATENT DOCUMENTS

| | | | |
|---|---|---|---|
| 3,478,660 | 11/1969 | Land | 354/139 |
| 3,832,722 | 8/1974 | Douglas | 354/29 |
| 3,896,459 | 7/1975 | Ogawa et al. | 354/34 |
| 3,977,014 | 8/1976 | Norris | 354/196 |
| 4,023,187 | 5/1977 | Shenk | 354/27 |
| 4,023,192 | 5/1977 | Simon et al. | 354/147 |
| 4,118,721 | 10/1978 | Hashimoto | 354/147 |
| 4,188,103 | 2/1980 | Biber et al. | 354/27 |
| 4,192,587 | 3/1980 | LaRocque et al. | 354/27 |

*Primary Examiner*—Donald A. Griffin
*Assistant Examiner*—Thomas H. Tarcza
*Attorney, Agent, or Firm*—Edward S. Roman

[57] ABSTRACT

A photographic camera exposure and flash fire control system provides for a proportional fill flash by firing an electronic flash or strobe at an aperture appropriate for the camera-to-subject range. The flash is fired during the closing movement of the shutter blade mechanism and subsequent to the integration of ambient scene light to a select proportion of the optimum film exposure value whereby the remaining proportion of the optimum film exposure value is provided by the artificial illumination from the flash during the closing of the shutter blades.

11 Claims, 4 Drawing Figures

FOLLOW FOCUS FLASH ARRANGEMENT

BACKGROUND OF THE INVENTION

1. Field of the Invention

This invention relates generally to an automatic exposure and flash fire control system for a photographic camera apparatus, and more particularly, to a system for automatically controlling the firing of a flash of artificial illumination under conditions of varying ambient scene light intensity and camera-to-subject distance range.

2. Description of the Prior Art

In the photographic art, exposure control systems embodying scanning shutter blade elements which operate to vary exposure aperture areas with time during the exposure interval are well-known as indicated by U.S. Pat. No. 3,942,183, entitled "Camera with Pivoting Blades", by G. Whiteside, issued Mar. 2, 1976, in common assignment herewith. Such scanning shutter blade mechanisms generally include a pair of counter reciprocating shutter blade elements each having a primary aperture that traverses the optical axis of the camera during the exposure interval. The primary apertures are shaped so that upon overlying one another during counter movement of the blades, there is defined an effective exposure aperture value which increases to a maximum value in a determinate period of time.

Exposure control is provided by a pair of secondary photocell apertures in respective shutter blade elements which admit scene light to a photoresponsive element in correspondence with the scene light admitted to the focal plane during shutter blade movement through an exposure cycle. The output from the photoresponsive element is directed to an integrator circuit which triggers upon reaching an integration level corresponding to a desired exposure value to terminate the exposure interval by returning the shutter blade elements back to their initial scene light blocking position.

Shutter mechanisms of the aforementioned type are often arranged to operate in synchronism with a source of artificial illumination such as an electronic flash or strobe. The shutter blade mechanism and strobe are generally arranged to operate in either a high ambient scene light intensity mode of operation where no artificial illumination is provided or a low ambient scene light intensity mode of operation where the strobe is fired to provide a source of artificial illumination. Under conditions of low ambient scene light intensity where the strobe is expected to be fired, the scanning shutter blade mechanism may be stopped at an aperture value corresponding to the camera-to-subject distance as determined by focusing the objective lens. Systems of the aforementioned type are generally referred to as "follow focus" systems and the maximum aperture to which the scanning shutter blade elements are allowed to open is controlled by the rangefinding or focusing system of the camera in a manner as is more fully disclosed in U.S. Pat. No. 3,977,014, entitled "Follow Focus Exposure Control System with Improved Uniform Trim Control", by P. Norris, issued Aug. 24, 1976, in common assignment herewith.

Such a system need not acutally stop the opening shutter blade movement at a maximum effective exposure aperture as determined by the rangefinding or focusing system of the camera, but may instead, vary the time at which the strobe light is fired during the opening shutter blade movement as determined in correspondence with the rangefinding or focusing system of the camera. Since the duration of the storbe light is short in comparison to the time required for the shutter blade mechanism to scan from its scene light blocking position to its maximum exposure aperture defining position, the aperture defined by the shutter blade elements at the instant of strobe firing for practical purposes constitutes the effective aperture by which the exposure occurs. Such a system is more fully described in U.S. Pat. No. 3,478,660, entitled "Photographic Apparatus with Flash Exposure Control System", by E. Land, issued Nov. 18, 1969, in common assignment herewith. Range responsive flash firing systems of the aforementioned type can also be utilized in conjunction with sonar rangefinding devices as more fully described in U.S. Pat. No. 4,188,103, entitled "Range Synchronized Flash Photographic Apparatus and Method for Achieving Optimum Exposure", filed Apr. 21, 1978, in common assignment herewith.

Exposure and artificial illumination control systems of the aforementioned type are generally intended to provide a source of artificial illumination only during the low ambient scene light intensity mode of operation. However, there may also be conditions during high ambient scene light intensity modes of operation wherein it becomes desirable to provide artificial illumination to fill in the photographic subject against a brightly back lit scene as is more fully disclosed in U.S. Pat. No. 4,023,187, entitled "Exposure Control System with Fill Flash Race Condition", by E. Shenk, issued May 10, 1977, in common assignment herewith. The aforementioned artificial illumination control system operates under conditions of low ambient scene light intensity to fire the strobe light at a predetermined time period subsequent to the initiation of the exposure interval and under conditions of high ambient scene light intensity to fire the strobe light as a consequence of the time integration of the scene light intensity incident to the photoresponsive element reaching a predetermined value. This fill flash system, however, fails to provide a select ratio between that portion of the exposure which is directly attributable to the artificial scene illumination and the remaining portion of the exposure which is directly attributable to ambient scene light illumination over a determinate range of camera-to-subject distances.

Most recently, a photographic exposure and flash fire control system as disclosed in U.S. Pat. No. 4,192,587, entitled "Proportional Fill Flash", by A. LaRocque, et al., filed November 13, 1978, in common assignment herewith provided for the firing of a strobe in a fill flash mode of operation in a manner whereby a select ratio may be maintained between that proportion of the exposure which is directly attributable to the artificial scene illumination and the remaining proportion of the exposure which is directly attributable to the ambient scene light illumination. Such a select proportional fill flash is accomplished by providing a means whereby the light integration control circuit discounts the artificial illumination provided by the strobe. Toward this end, the system includes a sample and hold circuit which operates to sample the output voltage from a photoresponsive element and to transfer the sampled output voltage directly to a light integrating circuit. However, upon the firing of the strobe, the sample and hold circuit operates to hold the sampled voltage immediately prior to the firing of the strobe and to apply this sampled voltage to the light integrating circuit for the duration of the strobe pulse. The aforementioned sample and hold circuit, however, provides additional electronic complexity to the photographic exposure and flash fire control system.

Therefore, it is the primary object of this invention to provide an exposure and flash fire control system for providing a proportional fill flash in a simplified manner under varying conditions of ambient scene light intensity and camera-to-subject range.

It is a further object of this invention to provide an exposure and flash fire control system which operates in a simplified manner without the benefit of a sample and hold circuit to discount the artificial illumination provided by the source of artificial illumination so that a select proportion of the optimum film exposure value may be directly attributable to ambient scene light while the remaining proportion of the optimum film exposure value may be directly attributable to the artificial scene light provided by the source of artificial illumination.

Other objects of the invention will be in part obvious and will in part appear hereinafter. The invention accordingly comprises a mechanism and system possessing a construction, combination of elements and arrangement of parts which are exemplified in the following detailed disclosure.

SUMMARY OF THE INVENTION

A photographic camera apparatus of the type suitable for use with a source of artificial illumination and having means for defining a film plane and an optical path for transmitting light from a scene along the optical path to expose photosensitive film located in the film plane is provided with an exposure and flash fire control system as follows. The system comprises a blade mechanism together with means for mounting the blade mechanism for displacement from an initial closed arrangement wherein the blade mechanism precludes scene light from being transmitted along the optical path to the film plane through an open arrangement wherein the blade mechanism defines a maximum aperture so as to allow the passage of scene light along the optical path to the film plane and then to a final closed arrangement wherein the blade mechanism again precludes scene light from being transmitted along the optical path to the film plane. This displacement of the blade mechanism serves to define an exposure interval during which scene light is incident upon the film plane. Means are also provided for detecting and integrating scene light in correspondence with the scene light admitted by the blade mechanism through the film plane and for providing an output signal in correspondence to the amount of scene light so detected. Drive means are provided which respond to the actuation thereof for initiating the displacement of the blade mechanism from its initial closed arrangement towards its open arrangement thereby commencing the exposure interval. The drive means then respond to the output signal of the scene light detecting and integrating means reaching a predetermined value indicative of a select film exposure value for affecting the displacement of the blade mechanism into its final closed arrangement.

Flash fire control means may be positioned in accordance with the range of the subject to be photographed to provide a flash fire signal to initiate the energization of the source of artificial illumination in response to the blade mechanism reaching a position in which the aperture defined by the blade mechanism corresponds to the subject range during movement of the blade mechanism towards its final closed arrangement subsequent to the output signal from the scene light detecting and integrating means reaching its predetermined value.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the acompanying drawings wherein:

DESCRIPTION OF THE PREFERRED EMBODIMENT

Figure 1:
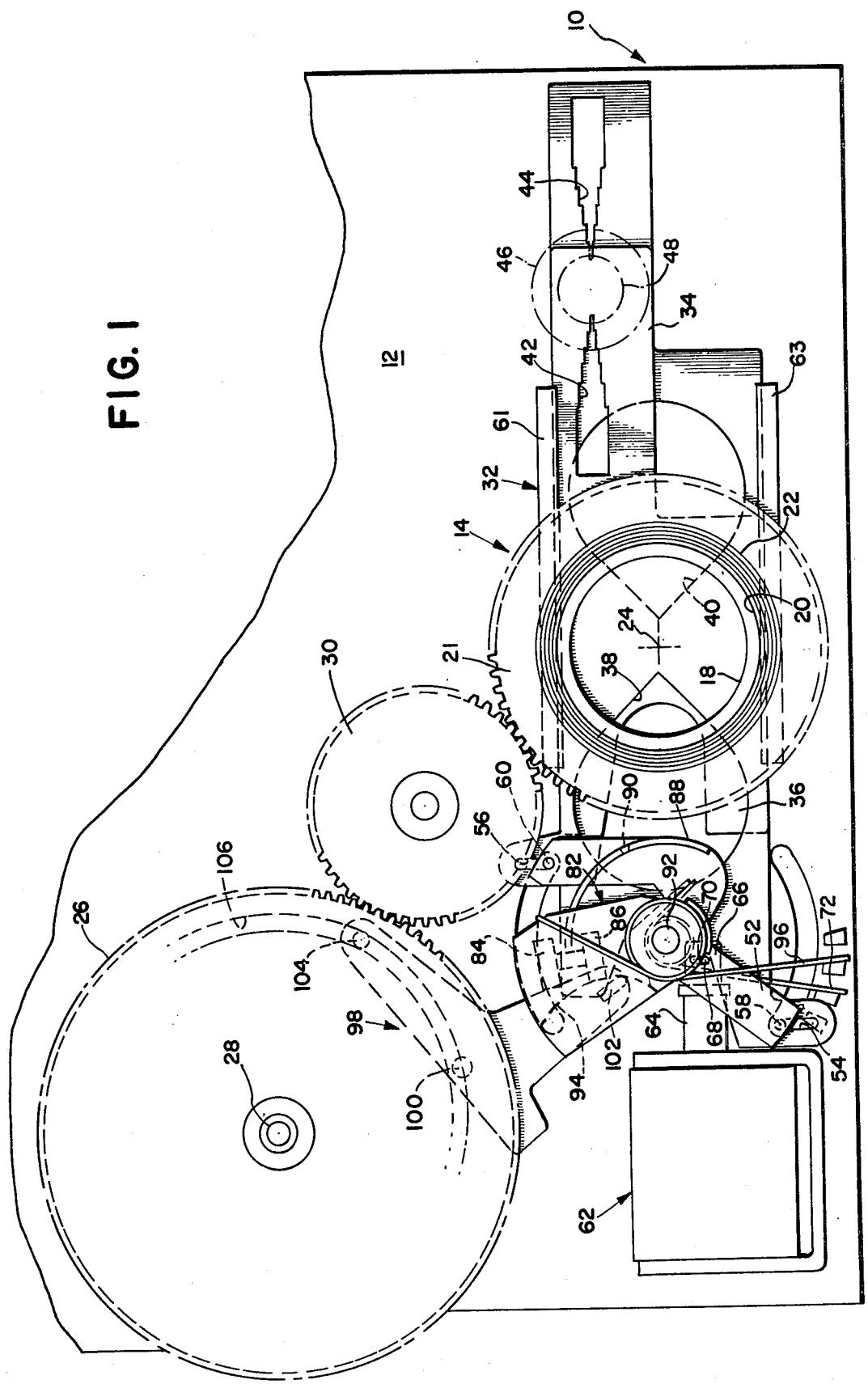
FIG. 1 is a front elevational view showing portions of the exposure and flash fire control system of this invention.
Figure 2:
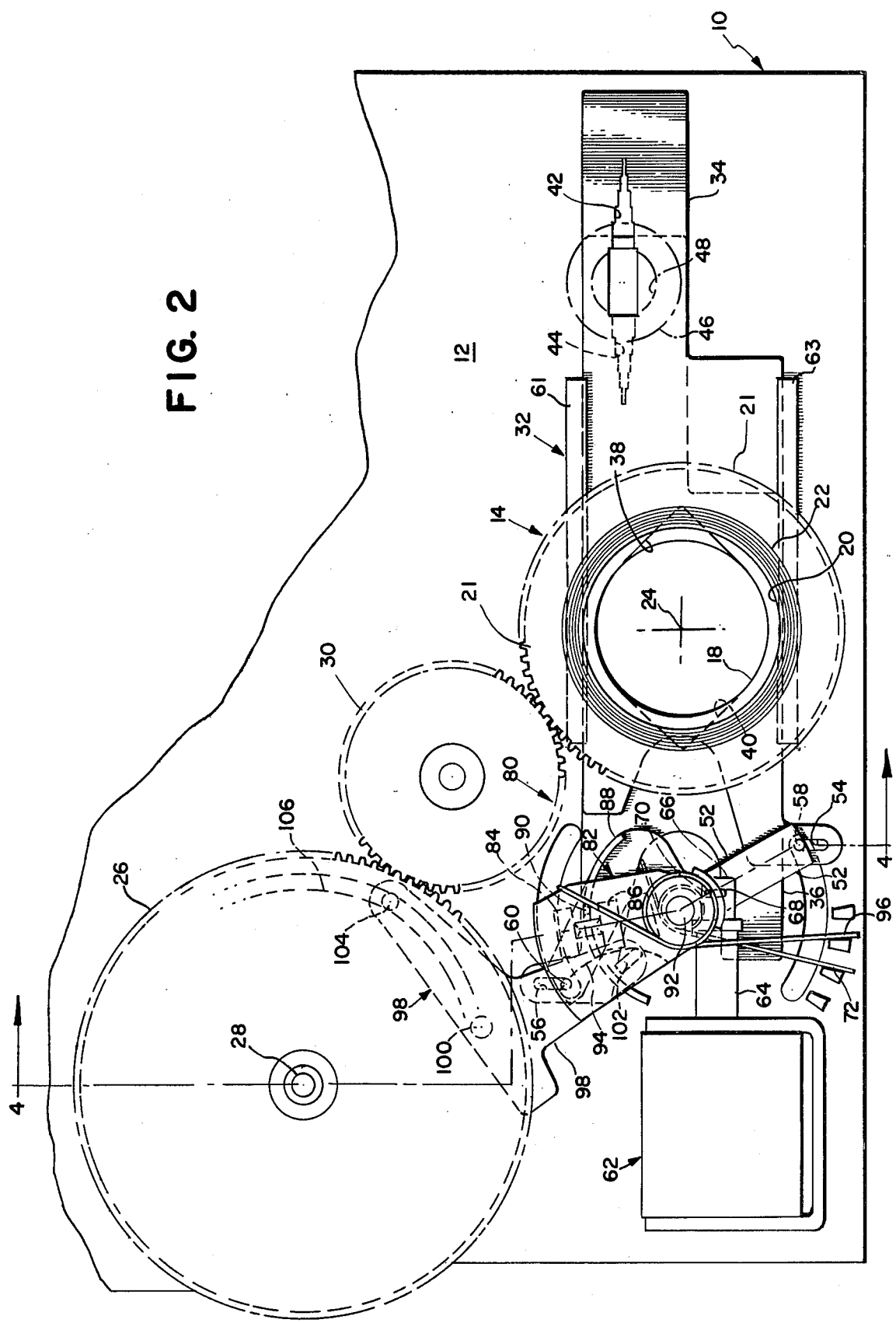
FIG. 2 is a front elevational view showing portions of the exposure and flash fire control system of FIG. 1 in a different position.

For referring now to FIGS. 1 and 2, it can be seen that the exposure and flash fire control system of this invention is associated with a photographic camera apparatus contained within a housing as shown generally at 10. A base block casting 12 is fixedly stationed within the housing 10 and selectively machined to support the various components of an exposure/control arrangement shown generally at 14. Centrally disposed within the base block casting 14, there is provided a light entry exposure opening 18 which defines the maximum available exposure aperture for the system.

An objective or taking lens 20 is provided in overlying relation to the light entry opening 18 and may comprise a plurality of individual lens elements retained in predetermined spaced relation by a cylindrical lens mount 22 which is externally threaded for tooth engagement within an internally threaded focus bezel 21. As is readily apparent, the focus bezel 21 is made rotatable with respect to the housing 10 to provide translational movement of the elements of lens 20 along a central optical axis 24 which is illustrated in FIGS. 1 and 2 as extending in a normal direction with respect to the plane of the drawing. Thus, rotation of the focus bezel 21 may be carried out in a manner to be subsequently described to provide displacement of the elements of objective lens 20 for focusing of image carrying rays through the light entry exposure opening 18 to a rearwardly positioned film plane by way of a reflecting mirror, all of which are stationed within a suitable light tight film exposure chamber within the housing 10 as illustrated in U.S. Pat. No. 4,040,072, entitled "Shutter Latch Arrangement Releasable Through Shutter Blade Actuation and Resettable Through Film Advancement", by B. Johnson, et al., issued Aug. 2, 1977, in common assignment herewith.

A manually rotatable focus wheel 26 is shown mounted upon a pivot pin 28 along one side of the housing 10. The focus wheel 26 is formed having peripherally disposed gear teeth which mesh with the gear teeth of an idler gear 30 which, in turn, is in driving connection with external gear teeth around the cylindrical focus bezel 21. Thus, as is now readily apparent, rotation of the focus wheel 26, in turn, operates to rotate the focus bezel 21 by way of the interconnecting idler gear 30 in a manner such that the rotational orientation of the focus wheel 26 continuously corresponds with the focus setting of the objective lens 30.

Intermediate the objective lens 20 and the light entry exposure opening 18, there is provided a shutter blade mechanism 32 including two overlapping shutter blade elements 34 and 36 of the so called "scanning type" which are mounted for counter reciprocating sliding movement with respect to each other in a manner to be herein described. The blade elements 34 and 36 include respectively scene light admitting primary apertures 38 and 40 to cooperatively define a progressive variation of effective aperture openings in accordance with simultaneous overlapping displacement of one blade element with respect to the other blade element in a manner as is described in the U.S. Pat. No. 3,832,722, entitled "Apparatus and System for Flash Photography," by L. Douglas, issued Aug. 27, 1974, in common assignment herewith. The apertures 38 and 40 are selectively shaped so as to overlap the light entry exposure opening 18 and thereby define a gradually varying effective aperture size as a function of the position of the blade elements 34 and 36.

Each of the blade elements 34 and 36 may additionally be configured to have corresponding photocell sweep secondary apertures as shown respectively at 42 and 44. Secondary apertures 42 and 44 may be configured in correspondence with the shapes of scene light admitting primary apertures 38 and 40. As is readily apparent, the secondary apertures 42 and 44 also move in correspondence with the primary apertures 38 and 40 to define a small secondary effective aperture for admitting the passage of scene light to a light detecting station as shown generally at 46. The light detecting station includes a photoresponsive element 48 which cooperates with a light integrating circuit as shown generally at 50 (FIG. 3) in a well-known manner in order to terminate the exposure as a function of the amount of light received through the secondary effective apertures 42 and 44.

Figure 4:
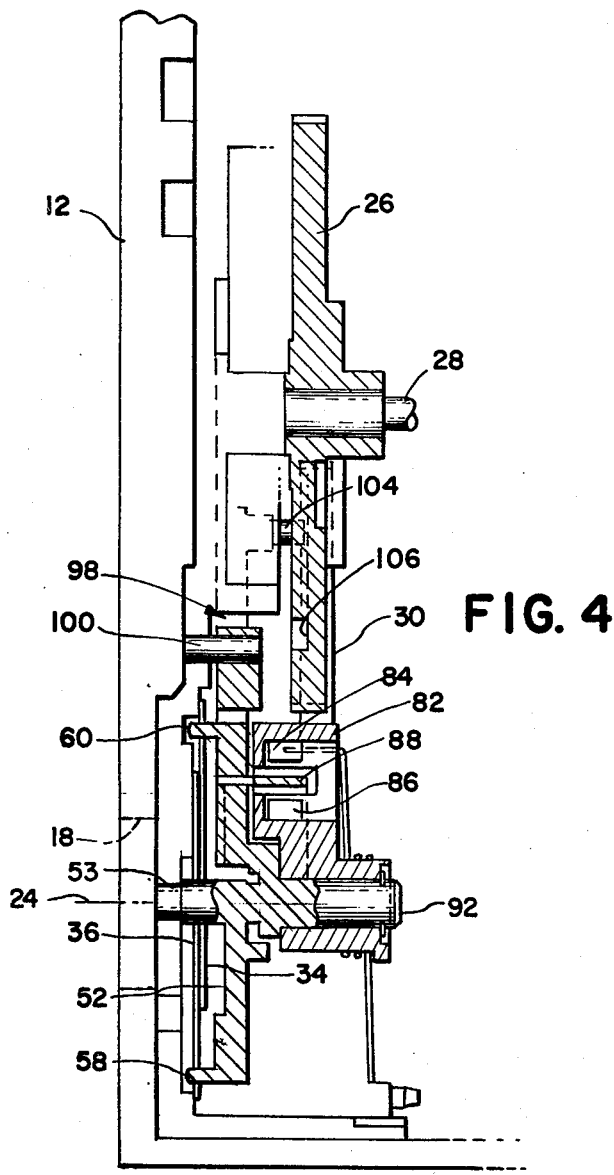
FIG. 4 is a cross-sectional view taken along the lines 4—4 of FIG. 2.

The shutter blade elements 34 and 36 may be mounted to slide horizontally in any well-known manner such as by rails shown generally at 61 and 63. One end of each of the blade elements 34 and 36 includes an extended portion which pivotally connects to a walking beam 52. The walking beam 52, in turn, is disposed for rotation relative to the base block casting 12 by pivotal connection to the base block casting 12 by a projecting pivot pin or stud 53 (FIG. 4) which may be integrally formed with the walking beam 52 and rotatably connected to the base block at a location spaced laterally apart from the light entry exposure opening 18.

In the preferred mode, the walking beam 52 is generally connected at its distal ends to the shutter blade elements 34 and 36 by respective pin members 58 and 60 which extend laterally outward from the walking beam 52. The pin members are preferably circular in cross-section and extend through respective elongate slots 54 and 56 in respective blade elements 34 and 36 so as to accommodate horizontally restricted reciprocal movement of the blades 34 and 36 along a cord through the locus of rotation of the distal ends of the walking beam 52. Thus, the walking beam 52 and the horizontal blade mounting rails cooperate to provide a means for mounting the shutter blade elements 34 and 36 for displacement from an initial closed arrangement wherein the blade elements 34 and 36 preclude scene light from being transmitted along the optical path 24 to the film plane as shown in FIG. 1 to an open arrangement wherein the blade elements 34 and 36 define a maximum aperture so as to allow the passage of scene light along the optical path 24 to the film plane as shown in FIG. 2, and then to a final closed arrangement wherein the blade elements 34 and 36 again preclude scene light from being transmitted along the optical path 24 to the film plane as again shown in FIG. 1. As is readily apparent, such a displacement of the blade mechanism serves to define an exposure interval during which scene light is incident upon the film plane.

Drive means are provided for displacing the blade mechanism in the aforementioned manner and include a tractive electromagnetic device in the form of a solenoid 62 employed to displace the shutter blade elements 34 and 36 with respect to each other and the base block casting 12. The solenoid 62 includes an internally disposed cylindrical plunger unit 64 which retracts inwardly into the body of the solenoid upon energization of the solenoid winding 63 (see FIG. 3). The solenoid plunger 64 includes an end cap 66 at the outside end thereof together with a vertical slot or groove 68 within the end cap 66 for loosely engaging a pin 70 extending outwardly from the walking beam 52. In this manner, the solenoid plunger 64 is affixed to the walking beam 52 so that longitudinal displacement of the plunger 64 will operate to rotate the walking beam 52 around its pivot pin 53 so as to appropriately displace the shutter blade elements 34 and 36. The drive means may additionally include a torsion spring 72 around the plunger 64 so as to continuously urge the end cap 66 outward of the solenoid 62 thereby also continuously urging the blade elements 34 and 36 toward the largest effective aperture defining position over the light entry exposure opening 18. As will be readily understood, in some shutter blade arrangements, it may be preferable to utilize a tension spring or a compression spring in place of the torsion spring 72. Thus, with the spring connection herein described, the exposure and flash fire control system of this invention is biased to continuously urge the shutter blade elements 34 and 36 into an open orientation.

In the present arrangement, the shutter blades 34 and 36 are drawn from their open position to their closed position when the solenoid 62 is energized. Consequently, energization of solenoid 62 prevents the shutter blades 34 and 36 from moving towards their maximum aperture defining position under the urging of spring 72. However, as should be readily understood, the exposure and flash fire control system of this invention would be equally applicable to photographic systems where the blades 34 and 36 are spring biased in a normally closed position. In addition, the invention herein described would be equally applicable to cameras of the reflex or non reflex type. For cameras of the reflex type, such as Polaroid's SX-70 cameras, the shutter blade elements normally remain in an open orientation and are closed upon the initial actuation of the camera to implement a photographic exposure cycle in a well-known manner. For cameras of the non reflex type, however, such as Polaroid's Pronto! and One-Step cameras, a latch mechanism may be provided so that the blades may be maintained in a closed orientation regardless of the continued energization of the solenoid 62 and its attendant battery drain in a manner as is more fully described in U.S. Pat. No. 4,040,072, supra.

A range responsive flash-fire sensing arrangement as shown generally at 80 (FIG. 3) comprises a rotatable sensor plate 82 disposed for rotation with respect to the base block casting 12 by a pivot pin 92 coaxially connected with respect to the pivot pin 53. The sensor plate 82 holds an LED 84 and a photoresponsive element 86 in spaced apart relation with respect to each other. An integral arcuate flange 88 extends laterally outward from the walking beam 52 and between the locus of rotation of the LED 84 and photoresponsive element 86 so as to block the light from the LED from reaching the photoresponsive element 86. The arcuate flange 88 includes a slit 90 thereacross which when aligned between the LED 84 and the photoresponsive element 86 allows the light from the LED to reach the photoresponsive element 86 and thereby provide the range responsive flash fire signal.

The sensor plate 82 further includes an integral profile cam surface 94 which is continuously engaged by a cam mover pin 102 from a bell crank 98 disposed for rotation with respect to the base block casting 12 by an interconnecting pivot pin 100. The sensor plate 82 is yieldably biased by a torsion spring 96 to rotate in a counterclockwise direction thereby maintaining the cam surface 94 in continuous contact against the mover pin 102. The bell crank 98, in turn, includes a cam follower pin 104 engaged to follow a face groove cam 106 formed within the inward face of the focus wheel 26.

Figure 3:
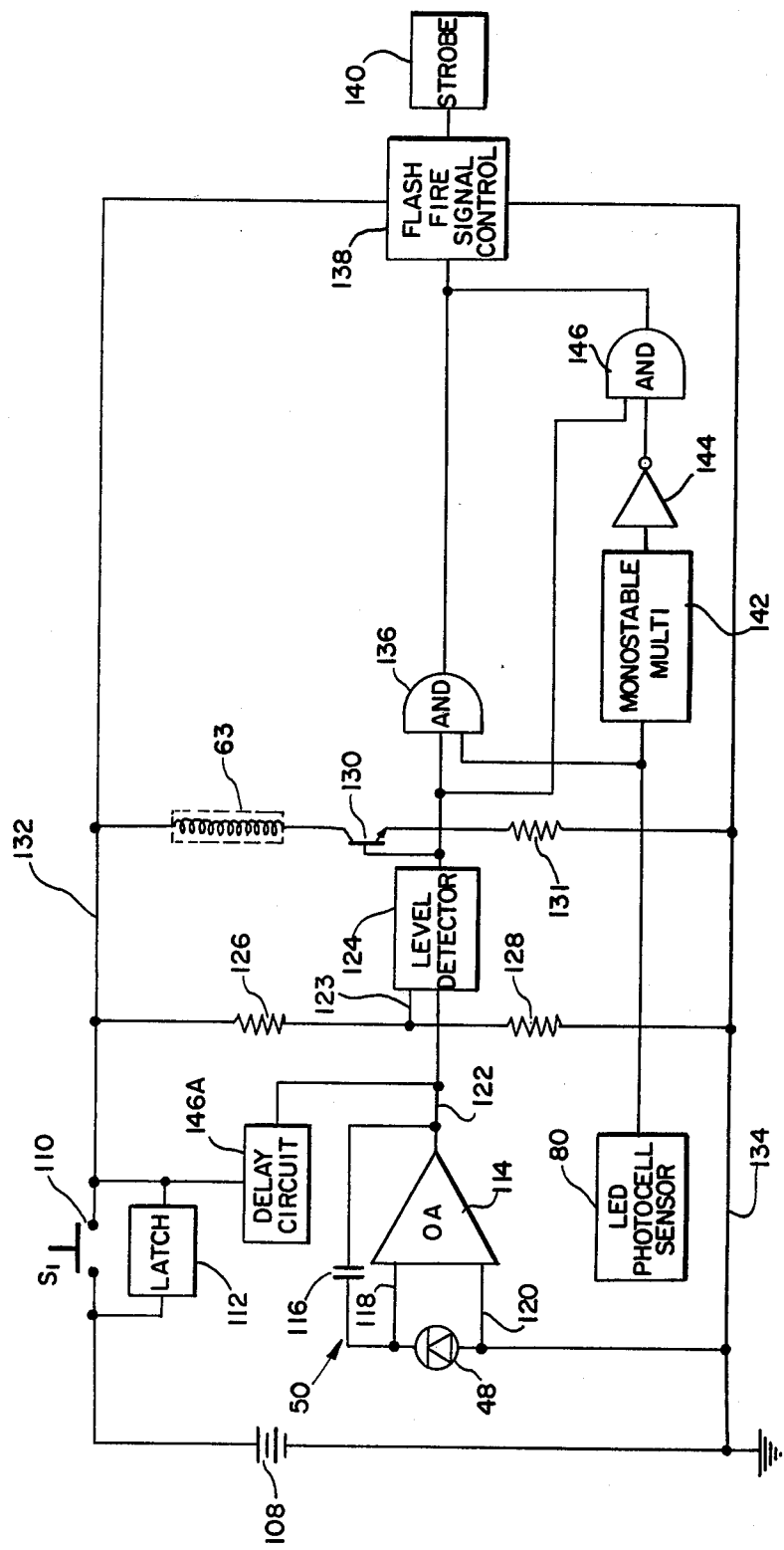
FIG. 3 is a schematic circuit diagram of the exposure and flash fire control system of this invention.

Turning now to FIG. 3, there is shown a schematic diagram for the control circuitry of this invention including the aforementioned scene light integrating circuit shown generally at 50. The circuit includes the photoresponsive element 48 which may be a photoresponsive cell of the type generating an output signal in correspondence with the levels of the scene light intensity incident thereon. The photoresponsive element 48 is orientated to evaluate the light levels of a scene coincident with the field of view of the lens system of the camera and operates in conjunction with the above-described aperture scanning arrangement which alters the amount of the scene light reaching the photoresponsive element 48 in correspondence with the progressively changing primary aperture size. The photoresponsive element 48 is coupled with an amplifier stage 114 along input lines 118 and 120 wherein the amplifier 114 is of a type sometimes referred to in the art as an "operational amplifier" which may be of a differential variety preferably fabricated in miniaturized form. When considered ideally, the amplifier 114 has infinite gain and infinite input impedance and a zero output impedance.

By virtue of a feedback path comprising an integration capacitor 116 connected between the input line 118 and an output line 122 from the operational amplifier 114, the photoresponsive element 48 is permitted to operate into an apparent low input impedance so as to function in a current mode, the current generated by the photoresponsive element 48 being limited substantially only by its internal impedance. Thus, under such loading, the photoresponsive element 48 in conjunction with the operational amplifier 114 and capacitor 116 is capable of providing a desirable linear output corresponding to the time integration of scene light intensity incident to the photoresponsive element 48.

Any difference of potential supplied by the photoresponsive element 48 across input leads 118 and 120 causes a voltage to be produced at output line 122. Relatively low signal voltages at the input of amplifier 114 which are present with the relatively low signal current from the photoresponsive element 48 are acted upon by the correspondingly high gain characteristic of the amplifier. Thus, although the amplifier 114 has a very high input impedance, the photoresponsive element 48, when connected in the circuit described, experiences only a very low impedance. Therefore, the current output of the photoresponsive element 48 is directed into the feedback path.

The initial charging of the integration capacitor 116 starts in synchronism with the first light admitted to the film plane when the photocell secondary apertures 42 and 44 initially cross to admit light to the photoresponsive element 48. The output signal from the light integrating circuit 50 at line 122 is directed to a level detector circuit 124 which may be of any conventional design such as a Schmitt trigger. As is readily apparent, the steady state reference voltage to the level detector 124 is established by biasing means comprising a first resistor 126 connected between a supply line 132 and an input line 123 together with a second resistor 128 connected between the input line 123 and a ground line 134. The reference voltage established at the input line 123 may be selected at a value representing an optimum film exposure. Preferably, however, the reference voltage level at the input line 123 is selected to be slightly less than ($\frac{3}{4}$) the voltage level representative of an optimum film exposure.

The output signal from the level detector 124 is directed to the base of an NPN transistor 130. The collector of transistor 130, in turn, is connected to the supply line 132 by way of the solenoid winding 63, while the emitter of transistor 130 is connected to the ground line 134 by way of an interconnecting resistor 131. The output signal from the level detector 124 is also directed to an AND gate 136. The output from the AND gate 136, in turn, is directed to a flash fire signal control circuit 138 which, in turn, provides a flash fire signal to a conventional electronic flash or strobe 140.

The output from the LED/photocell sensor arrangement 80 is directed to the other input terminal of the AND gate 136 and also to a monostable multivibrator (one shot) 142. The ouput from the "one shot" 142, in turn, is inverted by an inverter gate 144 and thereafter directed to an AND gate 146. The AND gate 146 receives its other input signal from the output of the level detector 124 and, in turn, provides an input signal to the flash fire signal control circuit 138.

As previously discussed, the exposure and flash fire control of this invention provides for a flash exposure at an effective aperture which is appropriate for the range of the subject to be photographed. In addition, there is also provided a proportional fill flash in which a select portion of the optimum film exposure value may be directly attributable to ambient scene light while the remaining portion of the optimum film exposure value may be directly attributable to artificial scene light provided by the strobe 140. As is well understood, prior to the commencement of a photographic exposure cycle, the photographer must compose and frame the subject to be photographed and thereafter focus the camera with regard to the photographic subject range. Focusing may be accomplished by the manual rotation of the focus wheel 26 which operates, in turn, by way of the idler gear 30 to rotate the focus bezel 21 and thereby axially displace the elements of the taking lens 20 to achieve the appropriate focus condition. As will be readily understood, the focus wheel 26 may alternatively be rotated in an automatic manner by a sonar controlled focusing apparatus of the type currently embodied in Polaroid's Sonar One-Step cameras.

Rotation of the focus wheel 26 and its associated face groove cam 106 operates to displace the cam follower pin 104 so as to rotate the bell crank 98 about its pivot pin 100. Rotation of the bell crank 98, in turn, operates by way of the cam mover pin 102 engaging the profile cam surface 94 to rotate the sensor plate 82 about its pivot pin 92. In this manner, the sensor plate 82 and its associated LED 84 and photoresponsive element 86 may be positioned in accordance with the range of the subject to be photographed along a locus of rotation adjacent the walking beam 52 locus of rotation. The LED/photocell combination can thus respond at any one of its positions along its locus of rotation to the slit 90 in the walking beam flange 88 subsequently reaching an aligned position between the LED 84 and photoresponsive element 86 in which the shutter blade elements define an effective aperture value corresponding to the subject range. Thus, the slit 90 is rotated to unblock the light path between the LED 84 and the photoresponsive element 86 when the blade mechanism reaches the aperture defining position corresponding to the subject range adjusted position of the sensor plate 82.

The photographer may then commence a photographic exposure cycle by depressing a button $S_1$ as shown schematically in FIG. 3. As is readily apparent, it is assumed that the strobe 140 is in a fully charged ready condition prior to the photographer actuating the button $S_1$. A battery 108 supply voltage will be maintained across the lines 132, 134 only as long as the photographer maintains switch $S_1$ in its depressed state, which may be perfectly adequate for situations where human reaction time in depressing and releasing the switch $S_1$ substantially exceeds the longest exposure time likely to be incurred. However, in situations where the normal exposure time is likely to exceed the human reaction time in depressing and releasing the switch $S_1$, there may be provided a latch circuit, as shown generally at 112, in parallel connection with respect to the switch $S_1$ for maintaining continuous energization of the exposure and flash fire control circuit even after release of the switch $S_1$. A suitable automatic latch circuit is more fully described in U.S. Pat. No. 3,744,385, entitled "Control System for Photographic Apparatus", by J. Burgarella, et al., issued July 10, 1973, in common assignment herewith.

Closure of the switch $S_1$ operates to release the shutter blade elements 34 and 36 to move under the urging influence of the drive spring 72 from the initial scene light blocking arrangement as shown in FIG. 1 toward the maximum aperture defining position as shown in FIG. 2 so as to define a continuous ever increasing progression of effective apertures over the optical center axis 24. Under conditions of high ambient scene light intensity, the photocell sweep secondary apertures 42 and 44 also define a continuous progression of ever increasing apertures over the photoresponsive element 48. The photoresponsive element 48 does provide an appropriate voltage response corresponding to the scene light intensity incident thereon, which voltage response is thereafter integrated by the operational amplifier 114 and feedback capacitor 116 to provide an output signal representative of the time integration of the scene light intensity incident to the photoresponsive element 48. The output signal level at line 122 from the light integrating circuit 50 increases until reaching the reference voltage level at line 123 corresponding to the select portion of the optimum film exposure value. Upon reaching this level, the level detector circuit 124 is triggered into an abrupt change of state at its output line changing from a generally low level (binary logic 0) which is insufficient to maintain the transistor 130 in conduction, to a substantially higher current level (binary logic 1) of sufficient value to turn on the transistor 130 and thus establish a current flow from collector to emitter through the transistor 130. Turning on the transistor 130, in turn, operates to energize the solenoid winding 63 to retract the plunger 64 and thereby rotate the walking beam 52 in a counterclockwise direction as viewed from FIGS. 1 and 2 against the biasing force of spring 72 thereby moving the shutter blade elements 34 and 36 into the light blocking position as shown in FIG. 1.

Upon commencement of the aforementioned photographic cycle, the LED/photocell sensor arrangement 80 also provides a low voltage output level (binary logic 0) since the walking beam flange 88 operates to block the light from the LED 84 from reaching the photoresponsive element 86. The output from the "one shot" 142 is also at a correspondingly low voltage signal level (binary logic 0), and this low output level is provided simultaneously to one input terminal of the AND gate 136 and to the inverter 144. The output from the inverter 144 is thus at a high voltage signal level (binary logic 1) so as to enable the AND gate 146. Initial rotation of the walking beam flange slit 90 between the LED 84 and photoresponsive element 86 operates to unblock the light path therebetween so as to provide a high output voltage level (binary logic 1) from the sensor arrangement 80. This high output level, in turn, enables the AND gate 136, and simultaneously triggers the "one shot" 142 to provide an output pulse of high voltage level corresponding to a binary logic 1 signal. The duration of the output pulse from the "one shot" 142 is at least as long as the longest allowed exposure time as determined by a delay circuit 146A, for reasons which will become apparent from the following discussion. The high voltage level (binary logic 1) signal from the "one shot" 142, in turn, is inverted by the inverter 144 to disable the AND gate 146. As soon as the slit 90 passes out of alignment between the LED 84 and photoresponsive element 86, the output signal level from the sensor 80 goes back to a low voltage (logic 0) signal level so as to disable the AND gate 136.

Thus, under conditions of normal ambient scene light intensity and subject range, the walking beam flange slit 90 will be rotated between the LED 84 and photoresponsive element 86 prior to the output voltage level from the integrator circuit 50 reaching the required level to trigger the level detector 124. As is now readily apparent, subsequent triggering of the level detector 124 operates only to energize the solenoid 62 winding since the AND gate 136 is in a disabled state as a result of the low voltage (logic 0) output signal level from the sensor 80. Energization of the solenoid 62 winding, however, operates to reverse the direction of rotation of the walking beam 52 so as to rotate the walking beam flange slit 90 back again between the LED 84 and photoresponsive element 86 so as to provide another high voltage level output signal (binary logic 1) to one input terminal of the AND gate 136. The other input terminal to the AND gate 136 is already enabled by the high voltage level output signal (logic 1) from the level detector 134 and therefore switches to provide a high voltage level (logic 1) input signal level to actuate the flash fire signal control circuit 138 to provide the appropriate signal to fire the strobe 140. Thus, only the ambient scene light is integrated during the opening movement of the shutter blade elements 34 and 36 and the strobe is subsequently fired during the closing movement of the shutter blade elements at the effective aperture appropriate for the range of subject to be photographed. Since the ambient scene light is only integrated to a level corresponding to some proportion of the optimum film exposure value (75%) with the strobe 140 providing the remaining proportion of the light required for an optimum film exposure, there is provided a true proportional fill flash wherein the proportions of the exposure value directly attributable to the ambient scene light and the artificial scene light provided by the strobe remain substantially constant under conditions of varying ambient scene light intensity and subject range.

Under conditions of high ambient scene light intensity and close subject range, it is possible that the level detector 124 will be triggered to energize the solenoid 62 winding prior to the walking beam rotating a sufficient degree for the slit 90 to pass between the LED 84 and photoresponsive element 86. Under these conditions, the "one shot" 142 will not be triggered prior to the energization of the solenoid 62 winding and will, therefore, provide an enabling high level voltage signal (binary logic 1) by way of the inverter 144 to one input terminal of the AND gate 146. Triggering of the level detector 124, in turn, will provide another high level input signal (logic level 1) to the other input terminal of the AND gate 146 so as to switch the output from the AND gate 146 to a high voltage level signal (logic level 1) thereby actuating the flash fire signal control circuit 138 to provide the appropriate flash fire signal to the strobe 140 in synchronism with the energization of the solenoid 62 winding. Thus, although the strobe 140 is not fired at the effective aperture appropriate for the range of the subject to be photographed, it is nevertheless fired at the maximum effective aperture possible which approximates the appropriate aperture for the subject range.

As is readily understood, under conditions of low ambient scene light intensity, the output voltage level from the light integrator 50 may never reach the required trigger level of the detector 124. Under these circumstances, the aforementioned time delay as provided by the delay circuit 146A can operate to allow the shutter blade elements 34 and 36 to remain at the maximum effective aperture defining position as shown in FIG. 2 for the longest time possible without incurring the effects of ordinary camera movement by the photographer. Upon expiration of this time delay, the circuit 146A provides a high level output signal to trigger the level detector 124 in the aforementioned manner. The solenoid 62 winding is then energized to close the shutter blade elements 34 and 36 and the flash fire signal is provided during the closing movement of the blades to fire the strobe 140 at that aperture corresponding to the subject range. Thus, by integrating the ambient scene light during the opening movement of the shutter blade elements and firing the strobe during the closing movement of the shutter blade elements at an effective aperture corresponding to the subject range, there is provided an arrangement whereby a select proportion of the optimum film exposure value may be directly provided by the ambient scene light during the opening movement of the shutter blade elements while the remaining proportion of the optimum film exposure value may be directly attributable to the artificial scene light provided by the strobe 140 during the closing movement of the shutter blade elements. In the preferred embodiment for the fill flash mode of operation, 25% of the film exposure may be directly attributable to the artificial scene light provided by the strobe 140 while 75% of the film exposure may be directly attributable to the ambient scene light. These proportions may be established by setting the reference input level on line 123 to the level detector 124 at a level corresponding to 0.75 of the optimum exposure value.

Other embodiments of the invention, including additions, subtractions, deletions and other modifications of the preferred disclosed embodiments of the invention will be obvious to those skilled in the art and are within the scope of the following claims.

What is claimed is:

1. A photographic camera apparatus of the type suitable for use with a source of artificial illumination and having means for defining a film plane and an optical path for transmitting light from a scene along the optical path to expose photosensitive film located in the film plane, said apparatus comprising:

a blade mechanism;

means for mounting said blade mechanism for displacement from an initial closed arrangement wherein said blade mechanism precludes scene light from being transmitted along the optical path to the film plane to an open arrangement wherein said blade mechanism defines a maximum aperture so as to allow the passage of scene light along the optical path to the film plane and then to a final closed arrangement wherein said blade mechanism again precludes scene light from being transmitted along the optical path to the film plane, wherein said blade mechanism defines a range of varying exposure apertures as it is displaced from its said open arrangement to its said final closed arrangement;

means responsive to the actuation thereof for effecting the displacement of said blade mechanism from its said initial closed arrangement to its said open arrangement and then into its said final closed arrangement to define an exposure interval during which scene light is incident upon the film plane; and control means for effecting the firing of the source of artificial illumination at any one of a plurality of aperture sizes from said range of aperture sizes defined by said blade mechanism as it is displaced from its said maximum aperture open arrangement to its said final arrangement.

2. A photographic camera apparatus of the type suitable for use with a source of artificial illumination and having means for defining a film plane and an optical path for transmitting light from a scene along the optical path to expose photosensitive film located in the film plane, said apparatus comprising:

a blade mechanism;

means for mounting said blade mechanism for displacement from an initial closed arrangement wherein said blade mechanism precludes scene light from being transmitted along the optical path to the film plane to an open arrangement wherein said blade mechanism defines a maximum aperture so as to allow the passage of scene light along the optical path to the film plane and then to a final closed arrangement wherein said blade mechanism again precludes scene light from being transmitted along the optical path to the film plane;

means responsive to the actuation thereof for effecting the displacement of said blade mechanism from its said initial closed arrangement to its said open arrangement and then into its said final closed arrangement to define an exposure interval during which scene light is incident upon the film plane; and means for effecting the firing of the source of artificial illumination as said blade mechanism is being displaced from its said open arrangement to its said final arrangement wherein said blade mechanism defines a range of varying exposure apertures as it is displaced from its said open arrangement to its said final arrangement and said firing means effects the firing of the source of artificial illumination at an exposure aperture within said range of varying exposure apertures correlated to the distance of the subject from said camera apparatus.

3. A photographic camera apparatus of the type suitable for use with a source of artificial illumination and having means for defining a film plane and an optical path for transmitting light from a scene along the optical path to expose photosensitive film located in the film plane, said apparatus comprising:

a blade mechanism;

means for mounting said blade mechanism for displacement from an initial closed arrangement wherein said blade mechanism precludes scene light from being transmitted along the optical path to the film plane to an open arrangement wherein said blade mechanism defines a maximum aperture so as to allow the passage of scene light along the optical path to the film plane and then through a range of varying exposure apertures to a final closed arrangement wherein said blade mechanism again precludes scene light from being transmitted along the optical path to the film plane, such a displacement of said blade mechanism serving to define an exposure interval during which scene light is incident upon the film plane;

means for sensing ambient scene light and for providing an output signal correlated therewith indicative of a select film exposure value;

drive means responsive to the actuation thereof for initiating the displacement of said blade mechanism from its said initial closed arrangement towards its said open arrangement thereby commencing the exposure interval and then, responsive to said output signal means for effecting the displacement of said blade mechanism into its said final closed arrangement; and means for effecting the firing of the source of artificial illumination as said blade mechanism is being displaced from its said open arrangement to its said final closed arrangement at an exposure aperture, within said range of varying exposure apertures, corresponding to the distance of the subject from said camera apparatus, said camera apparatus thus providing substantially the same amounts of ambient scene light and artificial scene light at said film plane during different exposure operations involving subjects at different distances from said camera apparatus within the effective range of the source of artificial illumination.

4. A photographic camera apparatus of the type suitable for use with a source of artificial illumination and having means for defining a film plane and an optical path for transmitting light from a scene along the optical path to expose photosensitive film located in the film plane, said apparatus comprising:

a blade mechanism;

means for mounting said blade mechanism for displacement from an initial closed arrangement wherein said blade mechanism precludes scene light from being transmitted along the optical path to the film plane to an open arrangement wherein said blade mechanism defines a maximum aperture so as to allow the passage of scene light along the optical path to the film plane and then to a final closed arrangement wherein said blade mechanism again precludes scene light from being transmitted along the optical path to the film plane, such a displacement of said blade mechanism serving to define an exposure interval during which scene light is incident upon the film plane;

means for detecting and integrating scene light in correspondence with the scene light admitted by said blade mechanism to the film plane and for providing an output signal in correspondence to the amount of scene light so detected;

drive means responsive to the actuation thereof for initiating the displacement of said blade mechanism from its said initial closed arrangement towards its said open arrangement thereby commencing the exposure interval and then, responsive to said output signal of said scene light detecting and integrating means reaching a predetermined value indicative of a select film exposure value for effecting the displacement of said blade mechanism into its said final closed arrangement; and means positionable in accordance with the range of a subject to be photographed for providing a flash fire signal to initiate the energization of the source of artificial illumination in response to said blade mechanism reaching a position in which the effective aperture defined by said blade mechanism corresponds to the subject range during movement of said blade mechanism toward its said final closed arrangement subsequent to said output signal from said scene light detecting and integrating means reaching said predetermined value.

5. The camera apparatus of claim 4 further comprising an adjustable focus objective lens wherein said means for providing said flash fire signal is automatically positioned in response to adjustment of the focus condition of said objective lens.

6. The camera apparatus of claim 4 wherein said means for providing said flash fire signal operates to provide said flash fire signal in response to said output signal from said scene light detecting and integrating means reaching said predetermined value prior to said blade mechanism reaching a position in which the effective aperture defined by said blade mechanism exceeds the effective aperture which corresponds to subject range.

7. The camera apparatus of claim 4 wherein said predetermined value corresponds to a select proportion of the optimum film exposure value.

8. The camera apparatus of claim 4 wherein said means for providing said flash fire signal includes sensing means positioned in accordance with the range of the subject to be photographed along a locus of travel adjacent the blade mechanism and mounting means locus of travel such that said sensing means responds at any one of its said positions along its said locus of travel to said blade mechanism and mounting means reaching an adjacent position along its said locus of travel in which said blade mechanism defines an effective aperture value corresponding to the subject range.

9. The camera apparatus of claim 8 wherein said sensing means comprises a source of artificial illumination and a photoresponsive element and said blade mechanism and mounting means locus of travel extends between said sensing means source of artificial illumination and said photoresponsive element so as to unblock the light path between said sensing means source of artificial illumination and said photoresponsive element when said blade mechanism reaches the aperture defining position corresponding to the subject range adjusted position of the sensing means.

10. The camera of claim 4 wherein said blade mechanism comprises a pair of shutter blade elements each having a primary scene light admitting aperture therethrough and a scene light detecting secondary aperture therethrough and wherein said blade mounting means mounts said shutter blade elements for general counter-reciprocating movement with respect to each other and comprises a walking beam pivotally connected at opposite ends thereof to respective ones of said shutter blade elements and pivotally connected for rotation about an axis between said opposite ends so as to impart generally counter-reciprocating movement to said shutter blade elements upon rotation thereof about said center axis, said sensing means being positioned in accordance with the range of the subject to be photographed along a locus of travel adjacent the locus of rotation of said walking beam such that said sensing means responds at any one of its said positions along its said locus of travel to said walking beam reaching an adjacent position along its locus of rotation in which said blade mechanism defines an effective aperture value corresponding to the subject range.

11. The camera of claim 10 wherein said sensing means comprises a source of artificial illumination and a photoresponsive element and said walking beam locus of rotation extends between said sensing means source of artificial illumination and said photoresponsive element so as to unblock the light path between said sensing means source of artificial illumination and said photoresponsive element when said shutter blade elements reach the aperture defining position corresponding to the subject range adjusted position of the sensing means.

* * * * *

Disclaimer 4,268,138.—*Richard J. Coppa,* Westwood, *Seymour Ellin,* Chestnut Hill, and *John W. Stempeck,* Reading, Mass. FOLLOW FOCUS FLASH ARRANGEMENT. Patent dated May 19, 1981. Disclaimer filed Aug. 23, 1983, by the assignee, *Polaroid Corp.*

Hereby enters this disclaimer to claims 1 and 2 of said patent.
[*Official Gazette October 18, 1983.*]